Dec. 30, 1969  K. H. HOPPMANN ETAL  3,486,818
REVERSIBLE SLIDE PROJECTOR

Filed June 6, 1968  5 Sheets-Sheet 1

INVENTOR
KURT H. HOPPMANN
HORST A. SCHOBER
BY Semmes and Semmes

ATTORNEYS

INVENTOR
KURT H. HOPPMANN
HORST A. SCHOBER
BY Semmes and Semmes
ATTORNEYS

Dec. 30, 1969  K. H. HOPPMANN ETAL  3,486,818
REVERSIBLE SLIDE PROJECTOR
Filed June 6, 1968  5 Sheets-Sheet 4

INVENTOR
KURT H. HOPPMANN
HORST A. SCHOBER
BY Semmes and Semmes
ATTORNEYS

Dec. 30, 1969   K. H. HOPPMANN ET AL   3,486,818
REVERSIBLE SLIDE PROJECTOR

Filed June 6, 1968   5 Sheets-Sheet 5

INVENTOR
KURT H. HOPPMANN
HORST A. SCHOBER
BY Semmes and Semmes
ATTORNEYS

United States Patent Office 3,486,818
Patented Dec. 30, 1969

3,486,818
REVERSIBLE SLIDE PROJECTOR
Kurt H. Hoppmann, Falls Church, and Horst A. Schober, Alexandria, Va., assignors to Hoppmann Corporation, Springfield, Va., a corporation of Virginia
Filed June 6, 1968, Ser. No. 735,065
Int. Cl. G03b 23/00
U.S. Cl. 353—118                    5 Claims

ABSTRACT OF THE DISCLOSURE

Slide projectors, particularly a rotary drum magazine with radially extending slide frame storage slots, the leading edges of the individual slide frames extending radially from the drum so as to present a continuous circumferential groove for locking with a slide frame reciprocating mechanism extending into the groove, so as to reciprocate the slide frames from the drum slots into a projection light path.

---

BACKGROUND OF THE INVENTION

The invention

A reversible slide projector having a rotary drum magazine in which are supported a plurality of radially positioned slide frames, independent mechanisms being employed both for rotation of the drum and reciprocation of the slide frames from the drum into a stage plate intersecting the light path and reversely back into the drum, while positively aligning the selected slide frame with the stage plate.

Description of the prior art

Rotary drum magazines for slide projectors have been in use for quite a number of years. However, a principal problem in the operation of the rotary drum magazine has been the inability of the magazine to lock positively with respect to a stage plate intersecting the light path. As a result the feeding of the slide frame into the light path has been hampered by jamming of the frame with the stage plate and reversely the feeding of the slide frame from the stage plate back into the rotary drum has also resulted in jamming and shut down of the unit for realignment of the drum and the stage plate.

A principal reference is Frederiksen (1,141,456) which provides a drum supported for rotation in a vertical plane, the slides falling by gravity into the light path. Note FIG. 3 where a trailing edge of the slide remains in its radial storage slot within the rotary drum, assisting registry.

SUMMARY OF THE INVENTION

Unlike Frederiksen, applicants' slide frames are mechanically reciprocated by a carriage mechanism from the rotary drum magazine into a stage plate intersecting the light path from the stage plate back into a radial storage slot in the rotary drum. Each slide frame has a radially extending locking tooth defining a carriage engaging aperture. The plurality of frames stored within the drum thus define a circumferential groove within which a carriage selector lug travels. As a particular frame is selected the lug positively locks onto the tooth of the individual frame and the reciprocating carriage mechanism takes over, independently of a mechanism for rotating the drum in positive increments. Positive locking of the slide frame in the stage plate intersecting the light path is provided by a magnet which engages a metallic tab on each frame. Since the trailing edge of the frame remains at all times in its radial slot within the rotary drum, vertical registry between stage plate and slot is continuously provided, enhancing reverse feeding. Also, since the trailing edge of the frame remains in the drum, there is assured positive horizontal alignment of the drum and stage plate. Thus jamming in both vertical and horizontal planes is avoided.

BRIEF DESCRIPTION OF THE DRAWINGS

In FIG. 1 rotary drum magazine 10 is shown as positioned above base 12 and adjacent light source housing 14. Light path 16 is shown as intersecting a stage plate 15 having upper track 22 and lower track 24 engaging frame slide 28 upon which slide 30 is mounted. Locking magnet 26 is shown positioned to one side of light path 16. The drum rotary drive mechanism is generally housed in lower housing 20.

In FIG. 2 drum 10 is shown as driven by spur gear 74 engaging a gear wheel 58 extending horizontally beneath the drum. In turn the slide frame carriage 140 is shown as reciprocated by eccentric mechanism 36. A projection lens 18 is shown intersecting the light path at one side of the housing 12.

Figure 1:
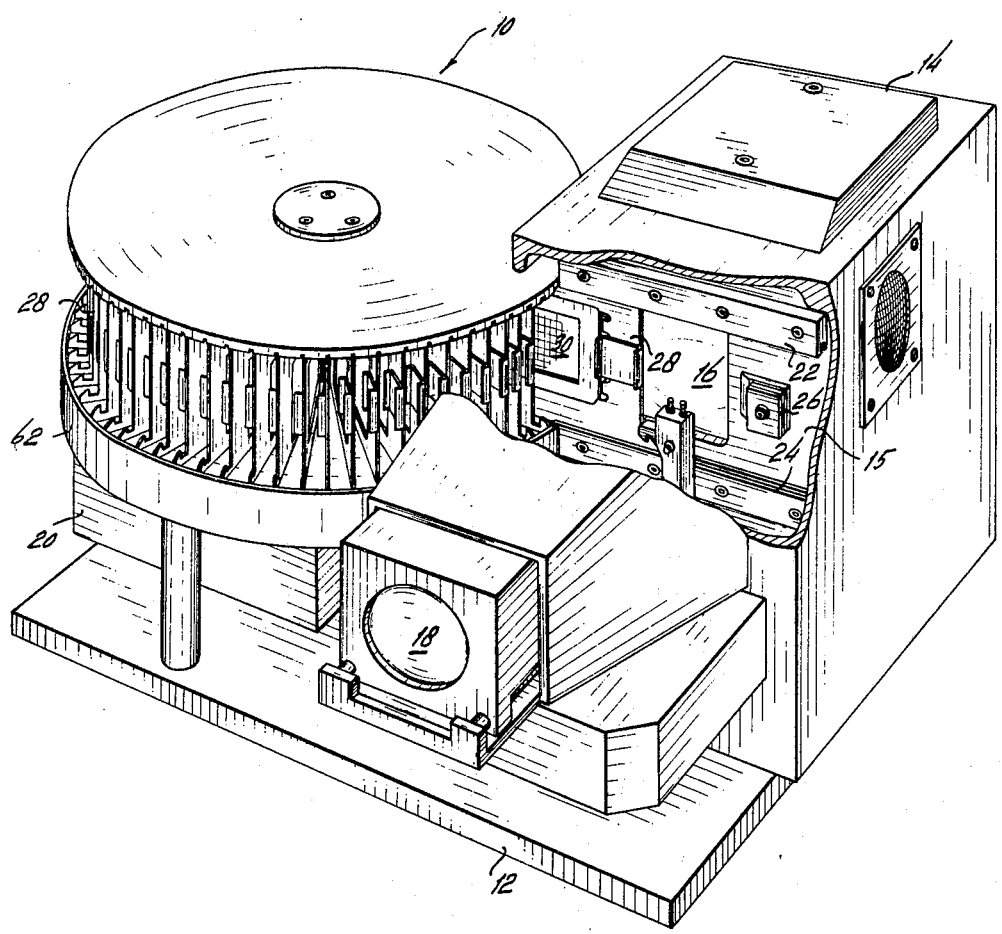
FIG. 1 is a perspective view of a proposed 3¼ by 4 inch reversible slide projector, showing the rotatable drum and the reciprocable frame carriage in process of pulling a frame from the drum into the stage plate intersecting the light path.
Figure 2:
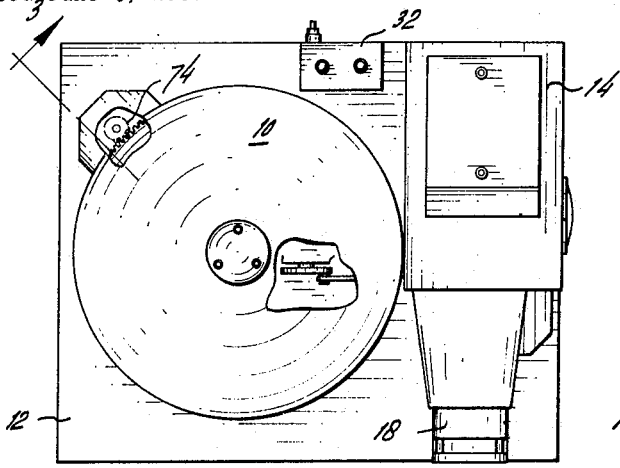
FIG. 2 is a partially fragmentary top plan, schematically illustrating the drum rotating mechanism and the frame carriage eccentric, reciprocating mechanism.
Figure 3:
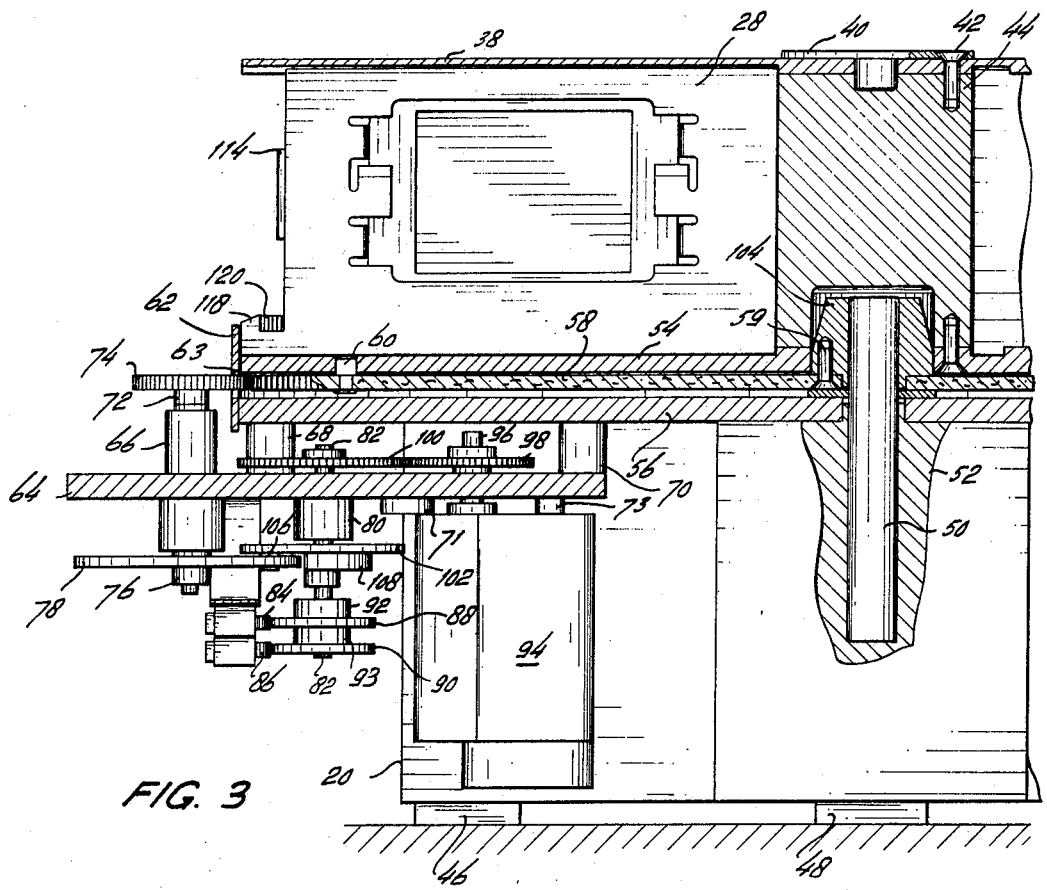
FIG. 3 is a vertical section, partially fragmentary, showing the Geneva drive drum rotating mechanism positioned beneath the rotary drum.

The rotary drum and its driving mechanism is more particularly illustrated in FIG. 3, drum 10 including a bottom plate 54, a top plate 38 secured about hub 44 and having a top hub plate 40 secured to the hub by means of recessed screws 42. Drums 10 defines a plurality of radially extending slots 152 within which the individual slide frames 28 are radially positioned. The entire drum assembly rotatably rests upon shaft 50 and gear wheel bushing 104 secured to gear wheel 58 by means of set screw 59. Gear wheel 58 may be locked to drum bottom plate 54 by means of lugs 60. A base plate 56 may extend beneath gear wheel 58 on top of support block 52 which in turn rests upon rubber or other cushion supports 46 and 48. A vertically extending guide piece 62 is secured peripherally of the drum base plate 56 aperture 63, which enables engaging of spur gear 74 with gear wheel 58.

Support plate 64 is secured intermediate drive motor 94 and plate 56 by means of braces 68, 70, 71 and 73.

Figure 4:
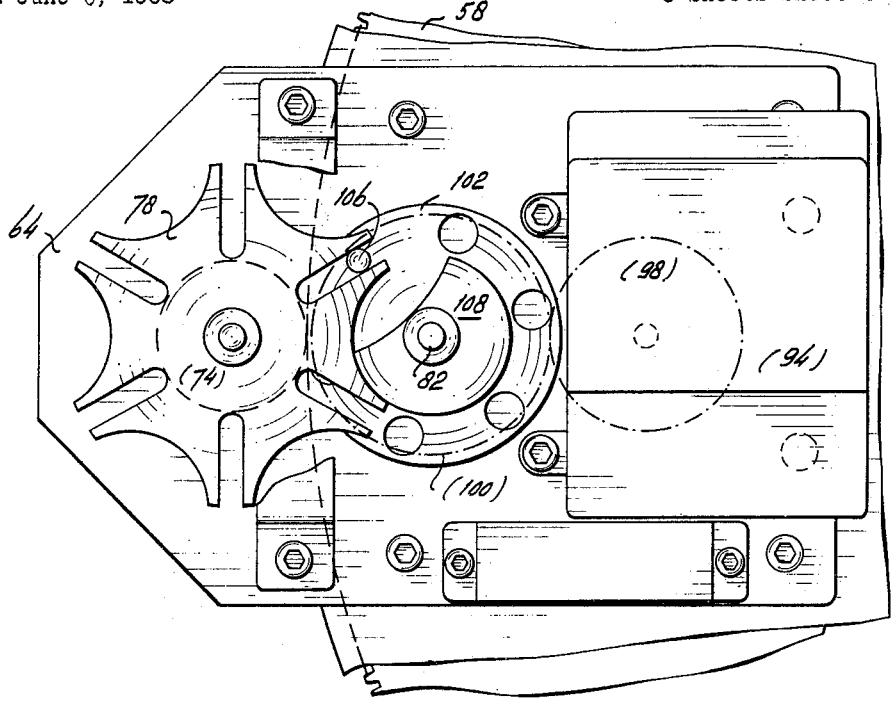
FIG. 4 is a fragmentary bottom plan of the Geneva drive mechanism showing the cam 108 and stud 106 engaging the Geneva drive wheel 78, as the drum is rotated.
Figure 5:
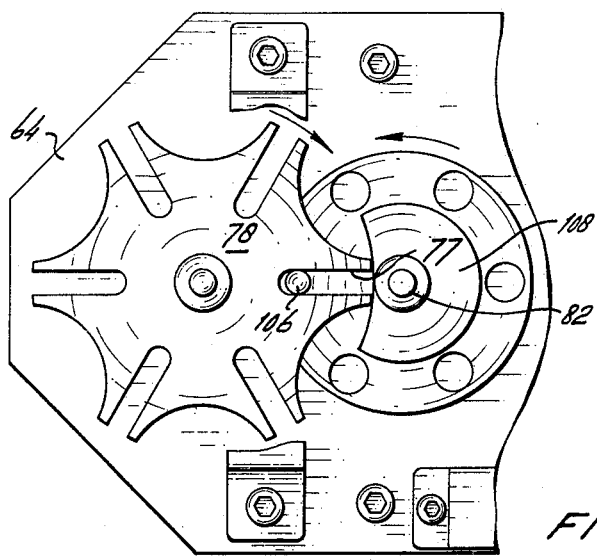
FIG. 5 is a similar fragmentary view showing the positive registration of stud 106 within groove 77, as the Geneva drive wheel 78 is in rotating transition.

Motor drive shaft 96 supports exterior gear 98 which engages gear 100 mounted upon driven shaft 82 to which are attached Geneva drive wheel 108 and cams 88 and 90. As shaft 96 turns, shaft 82 is rotated, in turn, causing rotation of cam 108 and Geneva gear engaging plate 102, having depending stud 106 which, as illustrated in FIGS. 4 and 5, engages the individual slots 77 within Geneva gear wheel 78 mounted upon shaft 76. Simultaneously with rotation of the Geneva gear 78, dual cam surfaces 88 and 90 contact dual switches 84 and 86. These switches 84 and 86 have electrical connections (not illustrated) leading to motor 94, so as to cut the motor at positive increments as the drum is rotated from one frame slot to another. An electrical override together with a read-out device may be provided to positively rotate the drum a given number of random increments. Rotation of the Geneva drive gear 78 and shaft 76 in turn causes rotation of gear 74 which engages gear plate 58.

Figure 9:
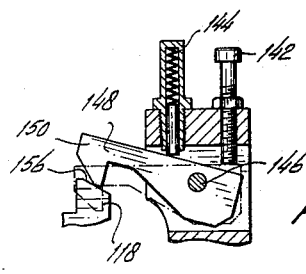
FIG. 9 is a like sectional view, showing the helical spring compression means and set screw means for adjusting the degree of pivotability of the lug 148.

FIGS. 6–11 illustrate the reciprocating carriage mechanism which carries the individual slide frames 28 from their radial slots 152 into stage plate top track 22 and bottom track 24 affixed to stage plate 15 by means of Allenhead screws or the like. The individual slide 28 may include leaf spring brackets 110 and 112 for pressure holding the individual slide 30 in position within bottom bracket 116. Also, at the slide leading edge 121 there is positioned metallic tab 114 for positive locking with magnet 54 supported in stage plate bracket 26. Slide frame circumferential tooth 118 having inclined surface 156 (see FIGS. 8 and 9) defines a circumferential groove 120 within which the carriage searching lug 148 travels. The searching lub 148 includes complementary inclined surface 150, as illustrated in FIG. 9 and is adjustably pressurized by means of helical spring 144 and set screw 142, lug 148 being pivoted upon pin 146 supported in carriage vertical top 140. The carriage 136 reciprocates upon transverse rods 132 and 134 supported in slide module housing 14. Eccentric 36 has reciprocating arm 124 pivotally connected as at 122. Arm 124 at its free end 128 medially engages arm 126 which is pivoted by means of rod 136 in the bottom of housing 14. The free end of arm 126 includes stud 130 engaging track 138 extending in the vertical piece 140.

Figure 6:
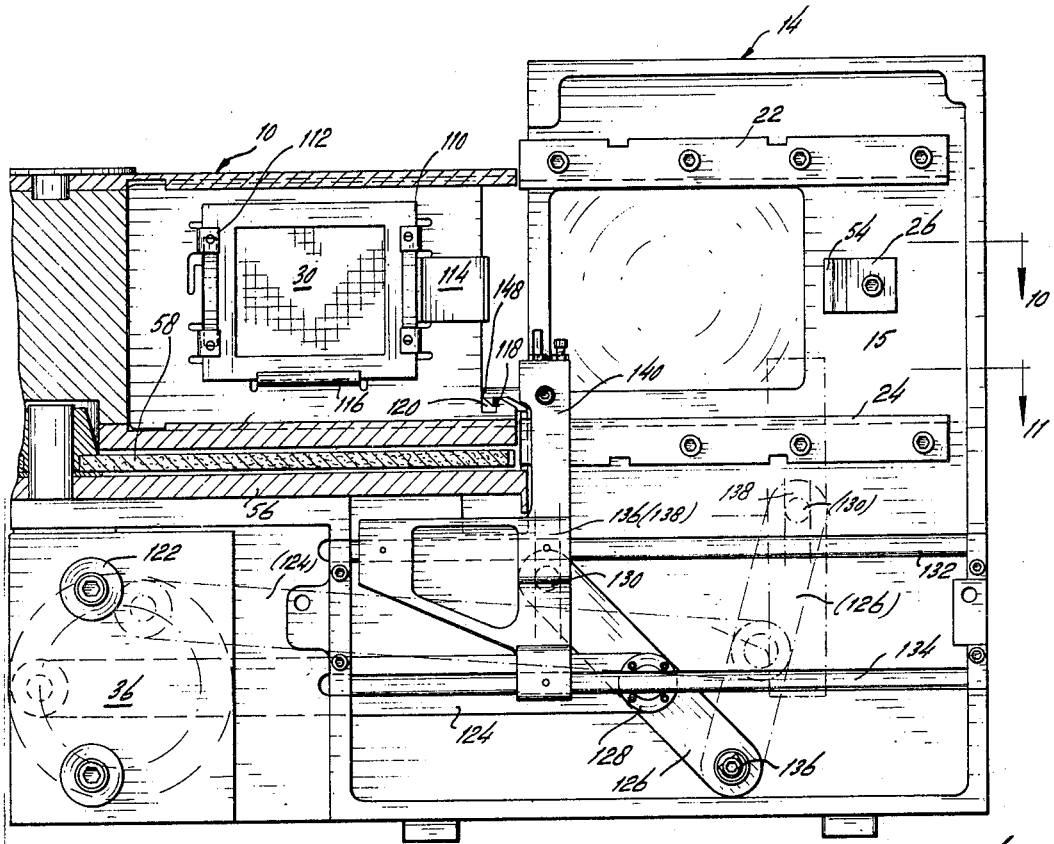
FIG. 6 is a front elevation, partially in section, showing the slide frame eccentric reciprocating mechanism lug 148 engaging the tooth 118 prior to pulling of the frame into the light path.

In the position indicated in FIG. 6, carriage 136 is adjacent the frame 28 with its lug 148 engaging tooth 118. There is also shown in phantom the radially outward pivoting of arm 126 to advance the slide frame 28 from the drum into the stage plate 15 with its trailing edge 153 remaining within the drum periphery as illustrated in FIG. 7.

Figures 7, 8:
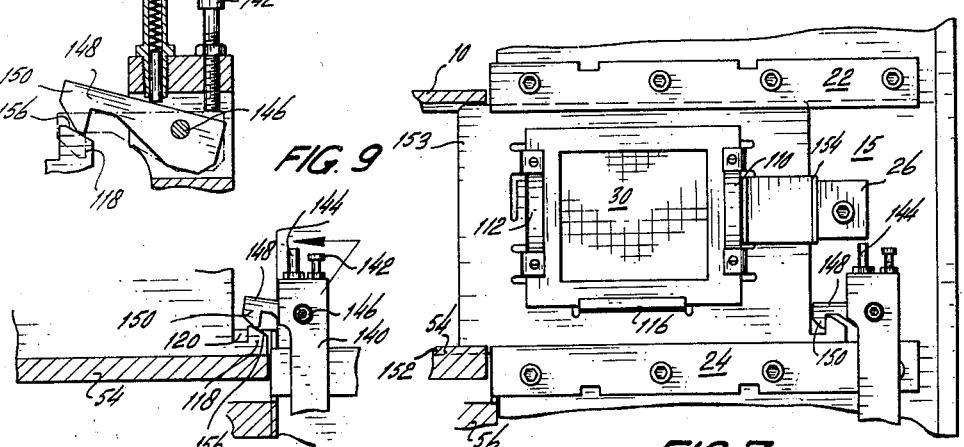
FIG. 7 is a like fragmentary view, showing the carriage after having pulled the frame into the light path.
FIG. 8 is a fragmentary section, showing the complementary inclined edges 150, 156 of carriage engaging lug 148 and the tooth 118.
Figure 10:
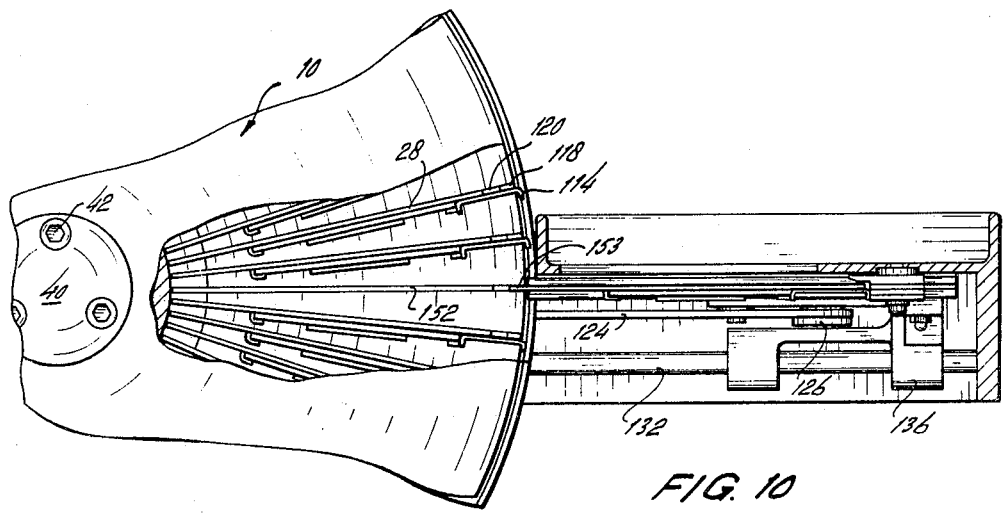
FIG. 10 is a fragmentary top plan, showing a slide frame pulled from the drum into the stage plate while its trailing edge 153 remains within the drum periphery.
Figure 11:
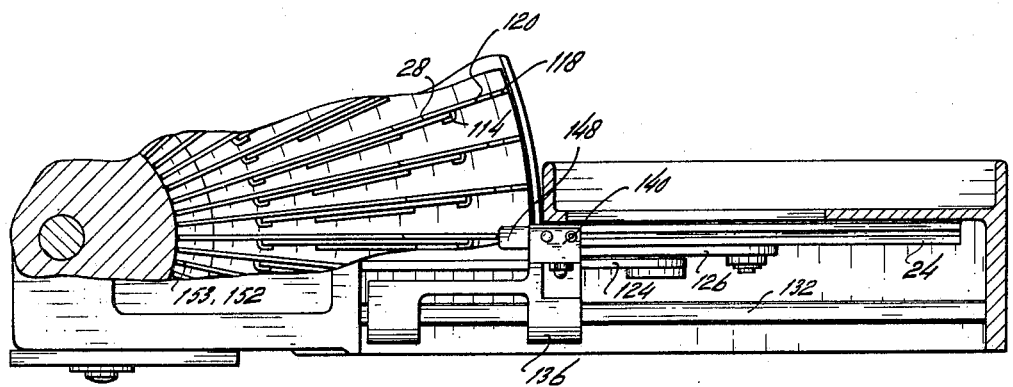
FIG. 11 is a similar fragmentary top plan, showing the return of the slide frame to its radial slot 152, scanning lug 148 resting in peripheral groove 120, defined by the slide frame teeth 118.

The FIG. 7 position with the slide frame trailing edge 153 remaining within the drum periphery is illustrated also in top plan in FIG. 10. The FIG. 6 position with the slide frame in its individual drum slot 152 and prior to reciprocation into the light path is illustrated, also, in FIG. 11.

The eccentric frame reciprocating drive and the Geneva drive are independently actuable and mutually exclusive to the extent that the frame cannot be reciprocated, so long as the Geneva drive is in operation, thus avoiding jamming.

As will be apparent, the proposed arrangement provides a virtually positive registry of the slide frame with the stage plate notwithstanding wear of drum and stage plate due to extensive use or the particular dimensions of the slide, for example 2 by 2, 2¼ by 2¼, 3¼ by 4 inches supported in the slide frame. The Geneva drive prevents creeping of the drum to either side of the stage plate registration slot defined by tracks 22 and 24 while locking the drum in registration position. Since the slide frame 28 never entirely leaves the drum magazine, the vertical or horizontal jamming of the slide frame either in drum or stage plate is totally eliminated.

Manifestly, various types of drum driving mechanisms and carriage reciprocating mechanisms may be employed without departing from the spirit and scope of invention.

We claim:
1. A reversible slide projector of the type having a slide supporting stage plate intersecting a light path and comprising:
(A) a base;
(B) a slide frame drum rotatably mounted on said base and including;
  (i) a plurality of radially extending slide frame holding slots;
  (ii) a Geneva drive mechanism positively locking said drum so that a selected frame holding slot is in vertical alignment with a stage plate;
(C) a plurality of slide frames supported in said slots, each of said slide frames including a radially outwardly extending lower tooth, defining with other slide frames a continuous circular groove within the inner perpihery of said drum;
(D) a light source mounted on said base in the same horizontal plane as said drum and defining a light path extending parallelly above said base;
(E) a stage plate, having slide frame top track and bottom track intersecting said light path, and supported upon said base;
(F) a slide frame engaging carriage mounted upon a pair of rods extending transversely beneath said stage plate, so that a slide frame engaged by said carriage frame may slide in said top track and said bottom track in said stage plate and including:
  (i) a locking arm having a slide frame-engaging lug extending into said circular groove. and spring pressurized to slide over and positively engage a slide frame tooth; and
  (ii) an eccentric drive and cam mechanism operably connected to said carriage, so as to reciprocate said carriage and a selected frame, transversely of said light path to the exclusion of said Geneva drive.

2. A reversible slide projector as in claim 1, said stage plate including a magnetic stop engageable with a corresponding magnetic element on said slide frame, so as to positively lock said slide frame across said light path.

3. A reversible slide projector as in claim 2, said frame being dimensioned so that a trailing edge of said frame remains extended in said drum slot as the leading edge of said slide frame engages said magnetic stop, said trailing edge of said slide frame vertically and horizontally aligning said drum with said stage plate.

4. A reversible slide projector as in claim 3, said drum Geneva drive, including a cut-off mechanism, cutting off said Geneva drive as said drum is rotated a given increment.

5. A reversible slide projector as in claim 2, said slide frame including a plurality of brackets adjustable to support slides of varying dimensions.

References Cited

UNITED STATES PATENTS

| | | | |
|---|---|---|---|
| 1,141,456 | 6/1915 | Frederiksen. | |
| 1,481,201 | 1/1924 | Headding et al. | 353—117 |
| 2,146,452 | 2/1939 | Spindler | 353—117 |
| 3,204,522 | 9/1965 | Wadsworth | 353—117 |
| 3,349,668 | 10/1967 | Zweidinger | 353—117 |

FOREIGN PATENTS

| | | |
|---|---|---|
| 580,663 | 9/1924 | France. |
| 623,164 | 3/1927 | France. |

HARRY N. HAROIAN, Primary Examiner